United States Patent [19]

Ohnishi et al.

[11] 4,125,842
[45] Nov. 14, 1978

[54] METHOD FOR LASER RECORDING USING ZEROTH ORDER LIGHT AND HEAT DEFORMABLE MEDIUM

[75] Inventors: Masahiro Ohnishi; Hiroshi Oono; Katutosi Tozaki, all of Asaka, Japan

[73] Assignee: Fuji Photo Film Co., Ltd., Minami Ashigara, Japan

[21] Appl. No.: 739,776

[22] Filed: Nov. 8, 1976

[30] Foreign Application Priority Data

Nov. 10, 1975 [JP] Japan ................................. 50-135309

[51] Int. Cl.$^2$ .......................................... G01D 15/14
[52] U.S. Cl. ..................................... 346/1; 346/76 L; 358/297
[58] Field of Search ............. 346/76 L, 108; 358/297, 358/302, 129; 350/161 W

[56] References Cited

U.S. PATENT DOCUMENTS

| | | | |
|---|---|---|---|
| 2,153,490 | 4/1939 | Wikkenhauser | 350/161 W |
| 2,155,661 | 4/1939 | Jeffree | 350/161 W X |
| 3,413,476 | 11/1968 | Gordon | 350/162 R X |
| 3,534,166 | 10/1970 | Korpel | 358/129 X |
| 3,665,483 | 5/1972 | Becker | 346/76 L X |
| 3,720,784 | 3/1973 | Maydan | 358/302 X |
| 3,751,587 | 8/1973 | Insler | 350/161 W X |
| 3,811,009 | 5/1974 | Fukumoto | 358/302 |

*Primary Examiner*—Joseph W. Hartary
*Attorney, Agent, or Firm*—Sughrue, Rothwell, Mion, Zinn and Macpeak

[57] ABSTRACT

Acousto-optically modulated zeroth order light from a laser source is recorded on a heat sensitive medium having a threshold deformation level.

2 Claims, 3 Drawing Figures

METHOD FOR LASER RECORDING USING ZEROTH ORDER LIGHT AND HEAT DEFORMABLE MEDIUM

BACKGROUND OF THE INVENTION

This invention relates to a method and apparatus for recording zeroth order light from a laser source, acousto-optically modulated in accordance with an information signal, on a heat sensitive recording medium having a threshold deformation level.

In the prior art, acousto-optical or electro-optical type modulators are empolyed to intensity-modulate laser light with a signal frequency higher than several KHz, with the acousto-optical type modulator being generally superior in respect of light extinction ratio and efficiency as compared to the electro-optical type modulator. An acousto-optical type modulator utilizes an optical elasticity effect whereby an acoustic wave varies the refractive index of a medium. More specifically, in an acousto-optical type modulator layers having different refractive indices are periodically formed in the medium, and light is diffracted through the layers to effect modulation.

Light modulation by an acousto-optical type modulator will be described with reference to FIGS. 1(a) and 1(b), wherein the abscissas represent time and the ordinates represent the quantity of light, the scale graduations of the two figures being equal.

In FIG. 1 three pulses of modulated light are shown. The variation of diffracted or "first order" is shown in FIG. 1(a), while the variation of undiffracted light, or "zeroth order" light, is shown in FIG. 1(b). The phase of the first order light is, of course, opposite to that of the zeroth order light. In FIG. 1(b) the undiffracted light $d$ is superposed on light $l$, which is not affected by the modulation, to form the composite zeroth order light signal. Zeroth order light has a very unsatisfactory light extinction ratio due to the presence of the unmodulated light $l$. If the zeroth order light is empolyed as the recording signal a fogging phenomenon will take place, and accordingly the resultant record image is poor in contrast. The first order light, on the other hand, has a very high light extinction ratio, on the order of 1000:1, and accordingly excellent iage contrast can be achieved.

Heretofore, in conventional laser recording apparatuses using an acousto-optical type of modulator, only the first order light has been employed for recording. That is, no laser recording apparatus of this type has yet employed the zeroth order light as the recording signal.

SUMMARY

In this invention, the fact that the peak magnitude of the zeroth order light in an acousto-optical type modulator is relatively large, and that even when laser light is modulated there is some light which is not affected by the modulation, is positively utilized for effectively recording information on a selected recording material.

The heat mode recording material used is made of a layer of material, such as a thin metallic film, which undergoes thermal deformation by fusion, evaporation, and/or cohesion when high intensity energy, such as a laser beam, is applied. It is preferable that the recording material be a single metal layer, layers made of a plurality of metals, a mixutre of metals, or an alloy of metals; however, dyes, pigments, or synthetic resins may also be used. Furthermore, material for increasing the sensitivity of the material may be included in the recording layer, a separate layer for increasing the sensitivity may be provided, or a protective layer may be added. The recording material may be formed by vacuum evaporation, electrical plating, non-electrolysis plating, sputtering, and ion plating.

In general, since the heat mode recording material has a high deformation threshold level, it is impossible to record information on it with energy less than the threshold value; however, if the energy exceeds the threshold value, the recording is fully and completely effected.

In one type of implementing apparatus, a decoded and amplified facsimile signal drivs an acousto-optical modulator supplied with a laser beam input. The Bragg diffracted first order light component is blocked by an opaque partition, while the relatively high intensity zeroth order light proceeds in its original path through an optical system which focuses it on the surface of a moving, heat deformable recording medium. A reflecting mirror in the optical system may be vibrationally oscillated or wobbled in a direction transverse to the recording line to increase the width thereof, if necessary, and the entire optical system may be moved transverse to the recording medium to implement scanning.

Thus, the relatively high energy of the zeroth order light, which is much easier to optically manipulate, is advantageously used as the recording signal, and the fogging effect usually attendant with such undiffracted or remaining light is overcome by using a heat sensitive recording medium with a threshold deformation level.

DETAILED DESCRIPTION OF THE PREFERRED EMBODIMENT

Figure 2:
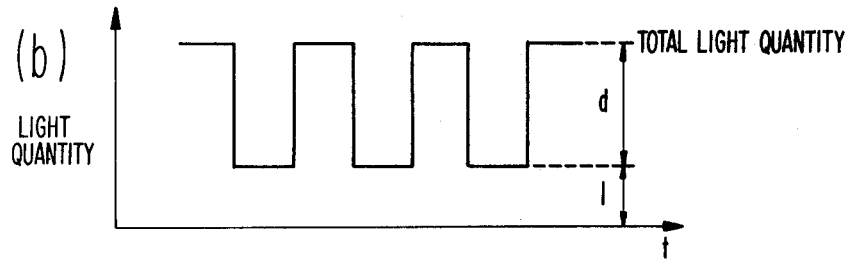
FIGS. 2(a) and 2(b) show explanatory diagrams illustrating how recording is achieved on heat mode material be laser light.

The recording effected on a heat deformable material will be described with reference to FIG. 2, in which reference numeral 1 designates a well-known substrate such as glass or PET, reference numeral 2 is a recording layer obtained by depositing a metal mixture, such as indium or bismuth, having a low melting point on the substrate 1 by vacuum evaporation, and reference numeral 3 is a protective layer.

Figure 1:
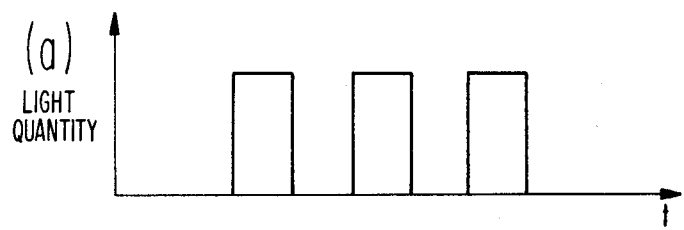
FIGS. 1(a) and 1(b) show graphical representations of the modulation performed by an acousto-optical type modulator, the first order diffraction light being shown in FIG. 1(a); while the zeroth order diffraction light is shown in FIG. 1(b).

FIG. 2(a) shows the unaffected state of the recording material when laser/light 5 of low intensity is focused onto a minute spot by a lens 4. FIG. 2(b) shows the state of the recording material when the intensity of the laser light 5 is increased above the threshold value, and the area of the recording layer irradiated by the laser light is removed by thermal deformation. As a result the exposed area becomes transparent and recording is thereby achieved. FIG. 2(a) might correspond to the presence of only light $l$ in FIG. 1(b), while FIG. 2(b) would result from the presence of the total zeroth order light $l + d$.

However, since the sensitivity of the heat mode material is relatively low, it is necessary when recording with relatively low intensity first order laser light to increase the quantity of light per unit area by focusing the laser light into a minute spot of several tens of microns in order to achieve a satisfactory recording. Laser light of several watts has barely enough power to perform the recording. Therefore, the emphasis in the prior art has been to develop optical systems in which the optical transmission loss of the laser light is minimized.

Figure 3:
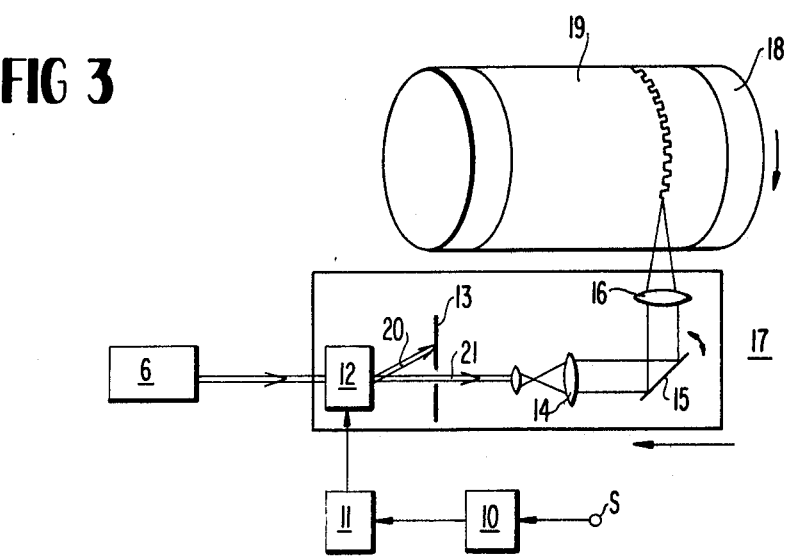
FIG. 3 shows a schematic explanatory diagram of an embodiment of this invention.

In the facsimile receiver shown in FIG. 3, a received facsimile signal S is subjected to high-frequency modulation and amplification by a demodulator and amplifier circuit 10 and a light modulator driving circuit 11, the output from the latter being applied to an acousto-optical type modulator 12. Laser light emitted from a source 6 is intensity-modulated with the facsimile signal by the acousto-optical type modulator 12. In this operation, the Bragg diffracted first order light 20 is blocked by a partition 13, and only the undiffracted zeroth order light 21 passes through a slit in the partition. The zeroth order light 21 is magnified by a beam magnifying lesn 14 and is reflected by a mirror 15. The reflected light passes through a focusing lens 16 and forms a minute light spot on a vacuum evaporated metal film 19 wound on a rotary drum 18.

The acousto-optical type modulator 12, the partition 13, the beam magnifying lens 14, the mirror 15, and the focusing lens 16 are fixed on a rack 17 which is movable in the direction of the arrow to implement scanning.

In a facsimile device approximately ten scanning lines are employed per millimeter to minimize the transmission time. Therefore, when the diameter of the focused laser spot is on the order of $10\mu$, the width of a recording line is much smaller than the interval between adjacent scanning lines. To offset this, the mirror 15 way be vibrated by a wobbling mechanism to increase the recording line width.

When an argon ion laser and a vacuum evaporated indium film were employed in the above-described receiver, a recording line width of $50\mu$ was obtained with a vacuum evaporated indium film on a drum rotated at a speed of 30 m/sec. No recording at the first order light positions was observed. The reason for this is that the peak energy of the zeroth order light is relatively large, and this light also benefits from a bias heating effect. That is, even when the laser beam is modulated, the unaffected light $l$ preheats the recording material at the position where information is to be recorded next. In addition, an argon ion laser has a variety of oscillation wavelengths, such as 5145 Å, 4880 Å and 4765 Å. Therefore, when the Bragg angle is tuned to an oscillation wavelength of 4880 Å in an acousto-optical type modulator, the modulation or diffraction of the 5145 Å and 4765 Å wave lengths is decreased, and the zeroth order light leakage component is thus increased. This also contributes to the bias heating effect.

The use of the zeroth order light is also advantageous because the light at any of the wavelengths present remains on the same optical axis, and can therefore be readily focused. Thus, the light of all wavelengths present contributes to the recording signal.

According to this invention, since the zeroth order light is employed as the source of recording energy it is unnecessary to use a high power laser source, and furthermore since the zeroth order light is never diffracted and its path remains straight and unchanged, the optical control of the light can be more readily and easily achieved. A disadvantage in the use of the first order light is that in order to increase its amplitude $d$, the electrical output of the modulation driver 11 must be disproportionately increased. With zeroth order light, on the other hand, a modulation factor which causes the modulation amplitude to merely cross the threshold value is adequate, and accordingly the output of the modulator driver 11 can be much lower and the manufacture thereof greatly simplified. Although an argon ion laser has been described above, it can obviously be replaced with other lasers such as, for example, a krypton ion laser of a YAG laser.

In order to describe the present invention, a high speed automatic facsimile receiver has been disclosed. The concept of the invention can also be applied, however, to similar devices such as a color scanner, a computer-operated photo-composing machine, or a recording section in a COM unit.

It is also possible to record the zeroth order light on a heat mode material and to record the lower intensity first order light on some other type of recording material, such as a photosensitive material, if these lights are selectively introduced to different recording surfaces, whereby a single laser recording apparatus can be used in tow different modes.

What is claimed is:

1. In a method of information recording including the steps of generating a beam of laser light having a plurality of oscillation wave lengths, and modulating said laser light by acousto-optical diffraction in accordance with an input information signal to produce diffracted, relatively low energy first order light and relatively high energy zeroth order light, said zeroth order light comprising undiffracted light and undiffractable light, the improvement comprising:
    (a) employing a heat sensitive recording material having a threshold deformation level,
    (b) optically directing said zeroth order light against the surface of said recording material, whereby said zeroth order light is employed as the information recording signal, and
    (c) preheating with said undiffractable light the recording material at the position where the information is to be recorded next, the intensity of said undiffractable light not being greater than said threshold deformation level.

2. A method as defined in claim 1, further comprising the step of blocking said diffracted first order light.

* * * * *